March 28, 1967     M. ALBERTSMAN ETAL     3,311,861
POTENTIOMETER TAPPING ARRANGEMENT
Original Filed May 31, 1956
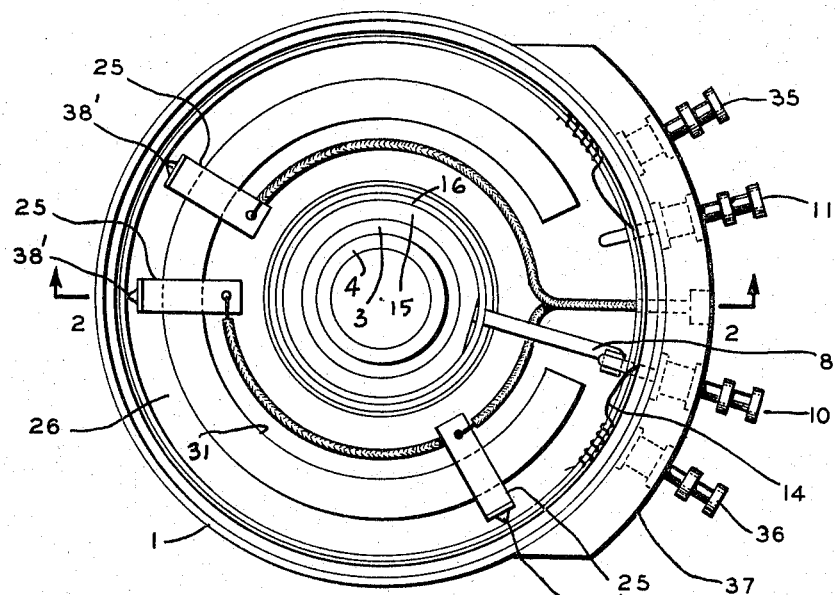
FIG. 1
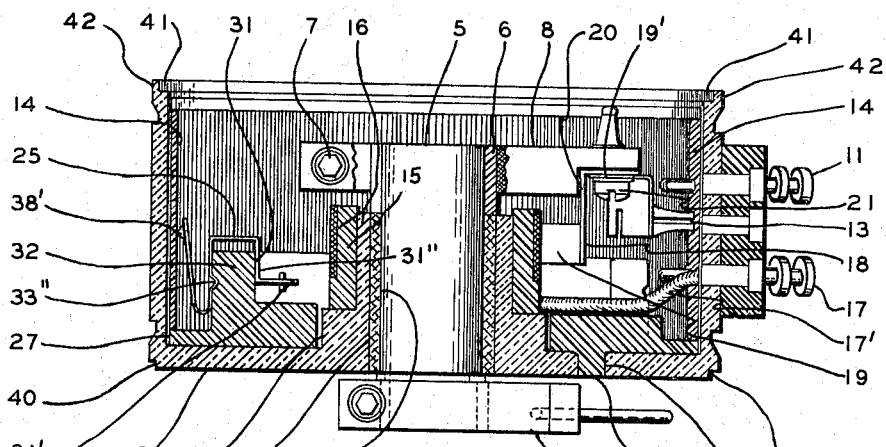
FIG. 2
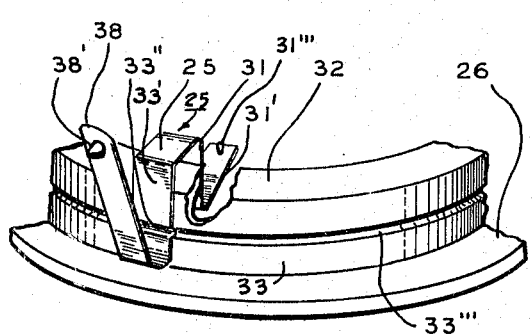
FIG. 3
FIG. 4
MAX ALBERTSMAN
MARTIN DOTSKO
         *INVENTORS*
BY *Richard L. Stephens*
                        ATTORNEY

United States Patent Office 3,311,861
Patented Mar. 28, 1967

3,311,861
POTENTIOMETER TAPPING ARRANGEMENT
Max Albertsman, Endicott, and Martin Dotsko, Binghamton, N.Y., assignors to General Precision, Inc., a corporation of Delaware
Continuation of application Ser. No. 588,310, May 31, 1956. This application May 9, 1960, Ser. No. 27,976
4 Claims. (Cl. 338—137)

This application is a continuation of our copending application Ser. No. 588,310, filed May 31, 1956, and now abandoned.

This invention relates to variable resistors of the potentiometer type and more particularly, the novel means for providing fixed taps with such a potentiometer.

Potentiometers find many uses in the electrical arts generally, and particularly in the analogue computer, automatic control and instrumentation arts. Analogue computer equipments commonly utilize many circuits in which potentiometers having their shaft positioned by mechanical inputs from servo mechanisms are used to multiply, or otherwise provide an output voltage which is a specified function of potentiometer shaft rotation. Many potentiometers utilized in analogue computer equipment are provided with taps to facilitate the connection of "padding" resistors in parallel with sections of the potentiometer resistance in order to provide a non-linear potential distribution across the potentiometer winding. For accurate analogue computation it is essential that such taps be properly located. Furthermore, the precise location of any tap on a potentiometer winding to give a specified output potential depends somewhat upon the impedance of the load connected to the potentiometer, the voltage applied across the potentiometer winding, and numerous other factors. In the design of computer and instrumentation equipment, it is usually impossible or impractical to consider all such factors in deciding the proper location of potentiometer taps, and numerous approximations are made. Unless the taps of the potentiometers used are readjusted after installation of the potentiometers into the equipment and after actual working conditions are established, errors due to such design approximations result in erroneous operation of the equipment.

Computer, automatic control and instrumentation apparatus often includes groups of potentiometers each having their wiper arms positioned by the same mechanical input quantity, which may take the form of a servo mechanism output shaft, for example. In such cases, it has usually been found desirable to mount a number of such potentiometers concentrically about the driving shaft in order to save space and to simplify ganging of the potentiometers. With such arrangements it is often desirable to adjust certain taps of a given potentiometer with respect to taps of another potentiometer as well as with respect to the winding and other taps of the given potentiometer.

In many of these applications potentiometers must be provided with taps at various positions along the potentiometer's resistive element in order to make fixed connections with the resistive element from external circuitry. One common arrangement consists of tap conductors welded at desired points to the resistive wire winding of wirewound potentiometers. The welding of such taps to a potentiometer winding is tedious and time-consuming, and in the case of potentiometers using fine wire the welding of taps often must be done while viewing the process through a strong magnifying glass. Another common tapping arrangement utilizes spring contacts terminally affixed to a support near the potentiometer resistive element, with the taps bearing against the resistive element in desired locations to provide the desired tap voltages. In order to insure fixed location of the taps with such an arrangement, the taps have usually been permanently and rigidly affixed to the support, while the support has been bodily movable with respect to the winding. It will be seen that such an arrangement affords adjustment of all the taps together with respect to the potentiometer resistive element, but does not afford adjustment of the taps wih respect to each other. One such arrangement of the prior art shows such an arrangement in which coarse adjustments are made by rotation of the mounting support ring and the shifting of the contacts to various tapped hole positions around the said mounting ring, where they are fastened in place by means of screws. The only fine adjustment possible derives from the skewing or twisting of the contact members themselves around the fixing screw axis, resulting in a limited range of adjustment with poor contact at the extreme positions, in addition to which the application of contact pressure is no longer radial, i.e., normal to the circumference of the resistance element with obvious disadvantages.

Therefore, it is a primary object of this invention to provide a potentiometer having an improved type of tapping arrangement.

It is another object of this invention to provide a potentiometer having taps which are adjustable with respect to the potentiometer resistance elements.

It is a further object of this invention to provide a potentiometer adjustable tap without the addition of screws or other locking device.

It is an additional object of this invention to provide a potentiometer in which the number of taps can be altered with a wide choice of locations.

It is another object of the invention to provide a potentiometer in which the number of taps can be altered with ease.

Other objects of the invention will be obvious and will become apparent as the description proceeds. For a better understanding of the invention reference may be had to the following description taken on conjunction with the drawing, wherein:

FIG. 1 shows a rear view of a rotary variable potentiometer having a tap arrangement constructed in accordance with the invention, with the rotatable contact arm assembly omitted for clarity.

FIG. 2 is a cross section view taken along the line 2—2 of FIG. 1, with the rotatable contact arm assembly shown; and FIG. 3 is a perspective view of a portion of the guide rail of the invention showing a potentiometer tap located thereon; and FIG. 4 is a perspective view of an alternative form of contact tap.

In the drawings like numerals refer to like parts. Referring now to FIGS. 1 and 2, there is shown a cylindrical housing 1 provided with an integral end wall 2. In the center of wall 2 bearing support 3 is provided for carrying bearing sleeve 4, or alternatively, a ball bearing (not shown). In bearing sleeve 4 is journaled a rotatable shaft 5. A rotatable contact arm 8 is carried by shaft 5, arm 8 being insulated by bushing 6 from shaft 5. Rotation of axial shaft 5 by movement of control arm 9 causes wiper contact 13 to traverse the potentiometer resistance element 14. Housing 1 is shown provided with a shoulder 40 and a recessed hub 41 having a flanged portion 42. When a plurality of potentiometers are concentrically ganged, the shoulder 40 of one potentiometer fits into and registers with the recessed portion 41 of an adjacent potentiometer.

A cylindrical sleeve bushing 15 axially surrounds and is carried by bearing boss 3. A metallic slip ring 16 is mounted at the outer surface of insulating sleeve 15 and fixedly supported thereon. Slip ring 16 provides electrical connection between the wiper contact 13 and stationary terminal 17 as the wiper contact 13 traverses resistive element 14. As shown in FIG. 2 wiper contact 13 has a base portion which is bolted directly to arm 8. Also bolted to arm 8 is the base portion 19' of a brush assembly 18. Wiping portion 19 of the brush assembly is carried by arm 8 so that wiping contact 19 bears against slip ring 16 during rotation of arm 8. The potential on wiper contact 13 is connected through brush 18, slip ring 16, and conductor 17' to terminal 17. The potentiometer resistance element is shown herein as comprising a wirewound linear card 14 which has been concentrically mounted within a cylindrical housing 1, with its extremities connected to terminals 10 and 11. It should be understood that the resistive element used with the invention may comprise carbon and metal film resistance elements as well as wirewound elements. Furthermore, the precise form of rotatable arm and wiper contact is not a feature of this invention and various other forms may be used. A rotatable arm-contact wiper arrangement of particular merit which may be used with the invention is shown in Patent No. 2,812,408, patented Nov. 5, 1957, by Edward A. Williford for Improved Electrical Potentiometer, which application has been assigned to the same assignee as the present invention.

All of the above described portions of the potentiometer may be completely conventional and they form no part of the present invention except when taken in connection with the novel tapping arrangement presently to be described. To provide a means for carrying adjustable taps 25 an annular guide rail 26 of insulating material such as micarta is provided to support a plurality of taps in fixed selected locations. Guide rail 26 is concentrically located along the inner face of end wall 2 along the inner surface 27 of cylindrical housing 1 and an external shoulder 28 of bearing boss 3. The guide rail 26 is provided with a protruding pin 29, which registers with a hole 30 drilled in end wall 2 to locate and prevent any rotation of guide rail 26 relative to wall 2 or resistive element 14. Guide rail 26 may be fastened securely to end wall 2 by means of screws or by a suitable adhesive, or both. An upwardly extending portion 32 of guide rail 26 is provided with a smooth surface 31 on its inner side and a grooved surface 33 on its outer surface. Each tap member 25, as best shown in FIG. 3, may comprise a substantially S-shaped member. The upper bar of the S is shown at 31″ as extending down along the inner surface 31 of annular rail 26. An upper connecting member of the S is shown at 31′ as extending substantially perpendicularly to portion 31″ and supporting a soldering terminal at 31‴. The middle bar 33′ of the S extends downwardly along the outer surface of the rail and contains a protuberance shown in the form of a lateral crimp 33″, which seats within recess 33‴ of track member 26 when a tap member is installed in position. The lower connecting member of the S is shown foreshortened in FIG. 3 and as comprising a bend which serves to carry the lower bar member 38 of the S, a contact point 38′ being carried on the lower bar member of the S. Each tap member is resilient and may be made, for example, of Phosphor bronze. The upper bar portion 31, the middle bar portion 33′ and the portion 25′ connecting them together may be seen to comprise a resilient U-shaped gripping member which is biased to grip the upper portion of rail or track member. Inasmuch as a recess is provided at 33‴ in the side of rail 32, its upper portion is greater in thickness than its thickness at the recess and provides an enlarged interlocking portion, so as protuberance 33″ is seated in recess 33‴, the U-shaped gripping member portions of the tap member effectively grip the upper portion of the rail and the tap is interlocked with the rail. A tap member may be installed and located on guide rail 26 merely by pressing the upper portion of the tap onto portion 32 of the guide rail with portion 31″ and portion 33′ of the tap clamping the tap onto the rail shown in FIG. 2. The resilience of the tap member serves to hold the tap upon the rail. Upper portion 31′ of the tap is provided with a solder lug portion to which a wire may be attached for making connection to terminal block 37. The shape of the contact spring 25 is of particular novelty and importance in the art since it not only provides a ready means of removal or replacement but, by its shape and design, renders particularly easy the problem of controlling contact pressure adjustments. It would be particularly noticeable to those skilled in the art that the compliance of the free length of the spring portion 38 is advantageous in that it is freely and readily adjustable, and moreover, such adjustments of spring tension are prevented by the complimentary grooved and crimped portion of the spring from unsettling the saddle portion of the spring from its secure seat on the guide rail. Moreover, the complementary grooved and crimped portions of the assembly are important in that they prevent the unseating of the tap when it is being slidably adjusted along the guide rail. These contact springs 25 may be snapped over the annular rail 26 in electrical contact with the resistance element (card) 14 in approximately the desired position for providing fixed taps, and a screw driver or similar tool may be utilized to slide them to the exact desired position during final adjustment under test conditions. In addition, many occasions arise when it is desirable to slide these contact springs along the annular rail for considerable distances. Thus the present invention provides means for readily adjusting the positions of these contacts individually or with respect to one another over wide ranges of adjustment or position even though the rotary potentiometer is completely assembled. Electrical connections to the various taps are made via terminals such as 35 and 36 in FIG. 1.

In will be seen from the above description and with reference to the drawings that the invention provides a novel and easy means of making adjustments to any or all of the "fixed" taps of a variable potentiometer, in that the simple manual movement of the S-shaped contact spring 25 around the circumference of the guide rail 26 permits a ready alteration of the tapping point, without the disadvantage of non radial pressure and the effects of tightening set screws mentioned in connection with the prior art. It will be obvious that taps may be removed, or additional taps added to the system by the mere effort of withdrawing them from, or re-seating them on, the guide rail 26, and making the appropriate electrical connections. It will be apparent to those skilled in the art that, for relatively small diameters of the guide rail 26, there is an inherent danger of some instability of the tap member in that the outer flat face 33′ is tangential to the outer circumference of the guide rail 26, whereas the surface 31″ is disposed chord wise across an arc of the inner circumference of the guide rail 26. Thus there is some danger during adjustments that, for small diameter guide rails, the tap member wil rock tangentially about the outer circumference, or dig into the inner circumference, of guide rail 26. While this could be overcome by shaping the mating surfaces of the tap member to accord with those of guide rail 26, or by keeping the width of the tap member very small, the alternative design of tap member shown in FIG. 4 overcomes the above stated difficulties.

It will be observed that the tap member shown in FIG. 4 is substantially the same as shown in FIGS. 1, 2 and 3, except that it has been slotted along its length. The same numbers are used in FIG. 4 to denote the corresponding parts of the tap member as shown in FIGS. 1, 2 and 3. It will be apparent to those skilled in the art that this expedient results in the above mentioned tangential seating of the surface 33 resolving into two small stable seating areas on the outer circumference of the guide rail 26, and in such manner, the chord like mating of surface 38 with the inner circumference has resolved into two small seating areas. By the adoption of this expedient there is now no danger of either of the forms of instability referred to above. Of particular importance in both embodiments of the tap member is the difference in the height of the guide rail 26 and the arch of the tap member. It will be apparent that the portion of the tap spring which is measured from the crimp to the top of the spring 25 must be substantially greater than that measured from the co-operating guide rail groove to the tap of the guide rail. This is to permit the complementing crimp and groove to engage without applying difficult manufacturing tolerances to the guide rail and tap spring dimensions.

A particular advantage of the invention is that the taps may be precisely adjusted relative to one another.

A further advantage is that any contacts which may have become dirty or worn may be removed for cleaning or replacement.

An additional advantage lies in the fact that considerable thermal mass is interposed between the contact point and the soldering terminal 31''' by the mass of the guide rail 26.

Of particular advantage is the fact that by suitable design, the main unit of the potentiometer, and the guide rail 26 and associated contacts, may be manufactured and supplied as separate items, thus permitting system modifications or developments from time to time.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A potentiometer, comprising in combination; a cylindrical housing having an end wall, a rotatable shaft member extending through said end wall and carrying an electrical contact arm within said housing; an annular resistance element disposed within said cylindrical housing and concentrically located with respect to said central bearing; an insulating annular track concentrically located with respect to said bearing and said annular resistance element, said insulating annular track member being radially located between said central bearing and said annular resistance element and provided with a side recess extending at least part way around said track to provide an enlarged interlocking portion, said electrical contact arm having a wiping contact carried thereon and adapted to engage said resistance element; a slidably adjustable tap member including a contact point for conductivity engaging said annular resistance element, said adjustable tap member being substantially S-shaped and including upper, middle and lower bar members connected by upper and lower connecting members, said contact point being carried on said lower bar member of said tap member; said middle bar, said upper connecting member and said upper bar member forming a resilient U-shaped gripping member resiliently biased to grip said enlarged interlocking portion of said annular track member, said middle bar member including a protuberance adapted to engage said side recess of said annular track member but provide for sliding adjustment of said tap.

2. In a precision potentiometer which comprises a cylindrical housing having at least one end wall through which a rotatable shaft is mounted coaxial with said housing, an electrical resistance element circularly disposed in said housing coaxial with said shaft, and a rotor having an electrical brush thereon and mounted on said shaft to rotate therewith so that said brush traverses the length of said resistance element as said shaft rotates; the invention which includes a circular track of insulating material mounted in said housing coaxial with said shaft, said track having a depression formed in a surface thereof which is parallel to the axis of said shaft, said depression extending at least a portion of the way around said surface, and a tap for said resistance element, said tap comprising a strip of electrically conductive spring material formed with a generally U-shaped portion which has a deformation mating with said depression and an elongated portion having a contact thereon, said tap being adapted to be snapped over said track at any desired location gripping said surface and with said contact in electrically conductive relation with said resistance element and with said deformation seated in said depression so that the natural spring tension of said strip material maintains the tap in position on said track with said contact biased against said resistance element while providing for sliding movement along said track to permit better positioning of said tap on said resistance element.

3. In a precision potentiometer which comprises a cylindrical housing having a centrally located shaft coaxial with said housing and a resistance element circularly arranged within the housing coaxial with said shaft and which includes a brush mounted on said shaft to rotate therewith and contact said resistance element over its length as the shaft rotates; the invention which includes a circular track of insulating material arranged in said housing coaxial with said shaft, said track having a depression in a surface which is parallel to the axis of said shaft, and a tap for said resistance element, said tap being formed of a strip of elastic electrically conductive material formed to closely fit over the top surface of said track and to grip at least said surface, said tap including a deformation which mates with said depression when the tap is in position over said track, said tap also including an elongated portion having an electrical contact for making electrical connection with said resistance element, the mating of said depression and said deformation maintaining the tap in position but providing for sliding movement along said track.

4. A precision potentiometer comprising a generally cylindrical housing having at least one end wall, a rotatable shaft passing through said end wall and extending into said housing, an elongated resistance element circularly arranged within said housing coaxial with said shaft, a brush mounted on said shaft to rotate therewith and adapted to contact said resistance element over its length as said shaft is rotated; the invention comprising a raised track of electrically insulating material in the form of an annulus, said track being maintained in said housing coaxial with said shaft and having at least one end parallel to said end wall, said track having a groove in a surface which is parallel to said shaft, and at least one tap for said electrical resistance element, said tap being formed of elastic electrically conductive material with a shape to pass over the end of said track and having legs which grip both of the track surfaces which are parallel to said shaft, one of said legs having a deformation therein which mates with the groove in said track and which engages said groove when said tap is in position in said housing, said tap also including an elongated portion having an electrical contact which engages the resistance element at any desired location when said tap is in position in said housing, and means to connect said tap to external circuitry.

References Cited by the Examiner

UNITED STATES PATENTS

| | | | |
|---|---|---|---|
| 2,606,984 | 8/1952 | Burgess | 338—174 X |
| 2,619,570 | 11/1952 | Takats | 338—202 |
| 2,711,463 | 6/1955 | Goeppinger et al. | 338—323 X |
| 2,831,095 | 4/1958 | Matthew | 338—184 X |
| 2,861,157 | 11/1958 | Chapple | 338—202 X |
| 2,901,719 | 8/1959 | Smith | 338—135 |
| 2,926,321 | 2/1960 | Stein | 338—190 |

FOREIGN PATENTS 1,093,002  11/1954  France.

ANTHONY BARTIS, *Primary Examiner.*

RAY K. WINDHAM, RICHARD M. WOOD, NATHAN MARMELSTEIN, *Examiners.*

B. M. MULLIN, H. T. POWELL, *Assistant Examiners.*